United States Patent
Dn et al.

(10) Patent No.: US 12,248,377 B2
(45) Date of Patent: Mar. 11, 2025

(54) ENABLING DATA INTEGRITY VERIFICATION WITH MULTIPATHING SOFTWARE AND STORAGE ARRAY MICROCODE

(71) Applicant: Dell Products, L.P., Hopkinton, MA (US)

(72) Inventors: Venkatesh Dn, Bangalore (IN); Peniel Charles, Bangalore (IN); Owen Crowley, Carrigaline (IE)

(73) Assignee: Dell Products, L.P., Hopkinton, MA (US)

( * ) Notice: Subject to any disclaimer, the term of this patent is extended or adjusted under 35 U.S.C. 154(b) by 70 days.

(21) Appl. No.: 18/136,385

(22) Filed: Apr. 19, 2023

(65) Prior Publication Data
US 2024/0354205 A1 Oct. 24, 2024

(51) Int. Cl.
*G06F 11/00* (2006.01)
*G06F 3/06* (2006.01)
(Continued)

(52) U.S. Cl.
CPC ........ *G06F 11/1625* (2013.01); *G06F 3/0619* (2013.01); *G06F 3/0635* (2013.01);
(Continued)

(58) Field of Classification Search
CPC ............. G06F 11/0745; G06F 11/1004; G06F 11/1616; G06F 11/1625; G06F 11/2007;
(Continued)

(56) References Cited

U.S. PATENT DOCUMENTS 6,493,343 B1 * 12/2002 Garcia ...................... H04L 1/22
709/213
8,910,031 B1 * 12/2014 Liu ........................ H03M 13/09
714/766

(Continued)

OTHER PUBLICATIONS

Martin K. Petersen, Oracle Linux Engineering, "I/O Controller Data Integrity Extensions", https://oss.oracle.com/~mkp/docs/dix.pdf, Nov. 25, 2009 (Year: 2009).*

*Primary Examiner* — Joseph D Manoskey
(74) *Attorney, Agent, or Firm* — Anderson Gorecki LLP

(57) ABSTRACT

Multipathing software in an IO path on a host implements DIF processing (MPIO DIF) to enable data integrity verification to be implemented between the host and a storage array. The multipathing software uses control signaling to identify a set of applications that have data integrity verification implemented using MPIO DIF. For application write IO operations, the multipathing software adds an 8-byte extended sector defined by DIF, to enable data integrity verification to be implemented by the storage array when the write IO is received at the storage array front-end. For application read IO operations, the storage array receives the read IO operation, determines that the read IO operation is from an MPIO DIF application, and the storage array adds an 8-byte extended sector defined by DIF, to enable data integrity verification to be implemented by the multipathing software when the read IO is received from the storage array.

18 Claims, 7 Drawing Sheets

(51) Int. Cl.
*G06F 11/10* (2006.01)
*G06F 11/16* (2006.01)
*G06F 11/20* (2006.01)
*G06F 21/64* (2013.01)

(52) U.S. Cl.
CPC ........ *G06F 3/0673* (2013.01); *G06F 11/1004* (2013.01); *G06F 11/2007* (2013.01); *G06F 21/64* (2013.01)

(58) Field of Classification Search
CPC .. G06F 11/3027; G06F 3/0619; G06F 3/0635; G06F 3/0673; G06F 21/64
See application file for complete search history.

(56) References Cited

U.S. PATENT DOCUMENTS

| | | | | |
|---|---|---|---|---|
| 2005/0188239 A1* | 8/2005 | Golasky | ................ | G06F 11/201 714/2 |
| 2013/0346723 A1* | 12/2013 | Kawamura | ........... | G06F 3/0623 711/170 |
| 2016/0335003 A1* | 11/2016 | Ahmed | ................ | G06F 3/0689 |
| 2022/0276799 A1* | 9/2022 | Kumar | .................. | G06F 3/067 |

* cited by examiner

ENABLING DATA INTEGRITY VERIFICATION WITH MULTIPATHING SOFTWARE AND STORAGE ARRAY MICROCODE

FIELD

This disclosure relates to computing systems and related devices and methods, and, more particularly, to a method and apparatus for enabling data integrity verification with multipathing software and storage array microcode.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, multipathing software is configured to implement DIF processing (MPIO DIF) to enable data integrity verification to be implemented between a host and a storage array. MPIO DIF can be used, for example, to provide data integrity verification in situations where the host does not have a host bus adapter/host IO controllers that are able to implement data integrity verification using Data Integrity Field (DIF), and in situations where the application executing at the host is not able to implement data integrity verification using Data Integrity Extensions (DIX). The multipathing software uses control signaling to identify a set of applications that have data integrity verification implemented using MPIO DIF. For host write IO operations, the multipathing software adds an 8-byte extended sector defined by DIF to enable data integrity verification by the storage array when the write IO is received at the storage array front-end. For host read IO operations, the storage array receives the host read IO operation, determines that the host read IO operation is from an application identified by the multipathing software as a MPIO DIF application, and the storage array adds an 8-byte extended sector defined by DIF to enable data integrity verification by the multipathing software when the read IO is received from the storage array.

In some embodiments, a method of enabling data integrity verification with multipathing software and storage array microcode, includes identifying an application executing on a host to multipathing software executing on the host, to instruct the multipathing software to implement data integrity verification for Input Output (IO) operations by the application by adding Data Integrity Field (DIF) block extensions to write IO operations by the application and by processing DIF block extensions for read IO operations by the application, and identifying the application to a storage array, by the multipathing software, to instruct the storage array to implement data integrity verification for IO operations by the application by processing DIF block extensions for the write IO operations by the application, and by adding DIF block extensions to responses to the read IO operations by the application. The method also includes receiving write IO operations from the application executing on the host by the multipathing software executing on the host, each first write IO operation including a respective data block, adding respective DIF extensions to each respective write IO operation, routing the write IO operations with DIF extensions by the multipathing software over a plurality of paths between the host and the storage array, by selecting between the plurality of paths by the multipathing software for each respective write IO operation, and forwarding the write IO operations with DIF extensions over the respective selected paths to the storage array.

In some embodiments, the application is executing in the context of an operating system, and the multipathing software is also executing in the context of the operating system.

In some embodiments, the multipathing software is implemented as part of a write IO path between the application and a host bus adapter, the host bus adapter being a physical component configured to transmit the write operations to the storage array. In some embodiments, the write IO path includes a filesystem layer, a block layer, the multipathing software, a Small Computer System Interface (SCSI) driver, and the host bus adapter.

In some embodiments, the multipathing software is high availability software configured to route the IO operations by the application over the plurality of paths between the host and the storage array.

In some embodiments, adding the respective DIF extensions to each respective write IO operation includes calculating a Cyclic Redundancy Check (CRC) from each respective data block, inserting the calculated CRC into a first part of the respective DIF extension, and adding an application identifier into a second part of the respective DIF extension.

In some embodiments, the method further includes receiving a read IO operation by the multipathing software from the application, sending the read IO operation to the storage array over a first of the plurality of paths, and receiving a read IO response from the storage array. In some embodiments, processing DIF block extensions for read IO operations by the application includes determining that the read IO response is responsive to the read IO request from the application, the read IO response including a data block and a DIF extension, implementing DIF data verification on the data block of the read IO response using the DIF extension, removing the DIF extension from the read IO response, and forwarding the data block of the read IO response to the application.

In some embodiments, implementing DIF data verification includes calculating a Cyclic Redundancy Check (CRC) of the data block and comparing the calculated CRC to a value of a guard tag of the DIF extension. In some embodiments, the method further includes, in response to comparing the calculated CRC with the value of the guard tag, determining that the calculated CRC does not match the value of the guard tag, and sending the read IO operation to the storage array over a second of the plurality of paths.

In some embodiments, a system for enabling data integrity verification with multipathing software and storage array microcode includes one or more processors and one or more storage devices storing instructions that are operable, when executed by the one or more processors, to cause the one or more processors to perform operations including identifying an application executing on a host to multipathing software executing on the host, to instruct the multipathing software to implement data integrity verification for Input Output (IO) operations by the application by adding Data Integrity Field (DIF) block extensions to write IO operations by the application and by processing DIF block extensions for read IO operations by the application, and identifying the application to a storage array, by the multipathing software, to instruct the storage array to implement data integrity verification for IO operations by the application by processing DIF block extensions for the write IO operations by the application, and by adding DIF block extensions to responses to the read IO operations by the application. The operations further include receiving write IO operations from the application executing on the host by the multipathing software executing on the host, each first write IO operation including a respective data block, adding respective DIF extensions to each respective write IO operation, routing the write IO operations with DIF extensions by the multipathing software over a plurality of paths between the host and the storage array, by selecting between the plurality of paths by the multipathing software for each respective write IO operation, and forwarding the write IO operations with DIF extensions over the respective selected paths to the storage array.

In some embodiments, the application is executing in the context of an operating system, and the multipathing software is also executing in the context of the operating system.

In some embodiments, the multipathing software is implemented as part of a write IO path between the application and a host bus adapter, the host bus adapter being a physical component configured to transmit the write operations to the storage array. In some embodiments, the write IO path includes a filesystem layer, a block layer, the multipathing software, a Small Computer System Interface (SCSI) driver, and the host bus adapter.

In some embodiments, the multipathing software is high availability software configured to route the IO operations by the application over the plurality of paths between the host and the storage array.

In some embodiments, adding the respective DIF extensions to each respective write IO operation includes calculating a Cyclic Redundancy Check (CRC) from each respective data block, inserting the calculated CRC into a first part of the respective DIF extension, and adding an application identifier into a second part of the respective DIF extension.

In some embodiments, the operations further include receiving a read IO operation by the multipathing software from the application, sending the read IO operation to the storage array over a first of the plurality of paths, and receiving a read IO response from the storage array. In some embodiments, processing DIF block extensions for read IO operations by the application includes determining that the read IO response is responsive to the read IO request from the application, the read IO response including a data block and a DIF extension, implementing DIF data verification on the data block of the read IO response using the DIF extension, removing the DIF extension from the read IO response, and forwarding the data block of the read IO response to the application. In some embodiments, implementing DIF data verification includes calculating a Cyclic Redundancy Check (CRC) of the data block and comparing the calculated CRC to a value of a guard tag of the DIF extension. In some embodiments the operations further include, in response to comparing the calculated CRC with the value of the guard tag, determining that the calculated CRC does not match the value of the guard tag, and sending the read IO operation to the storage array over a second of the plurality of paths.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
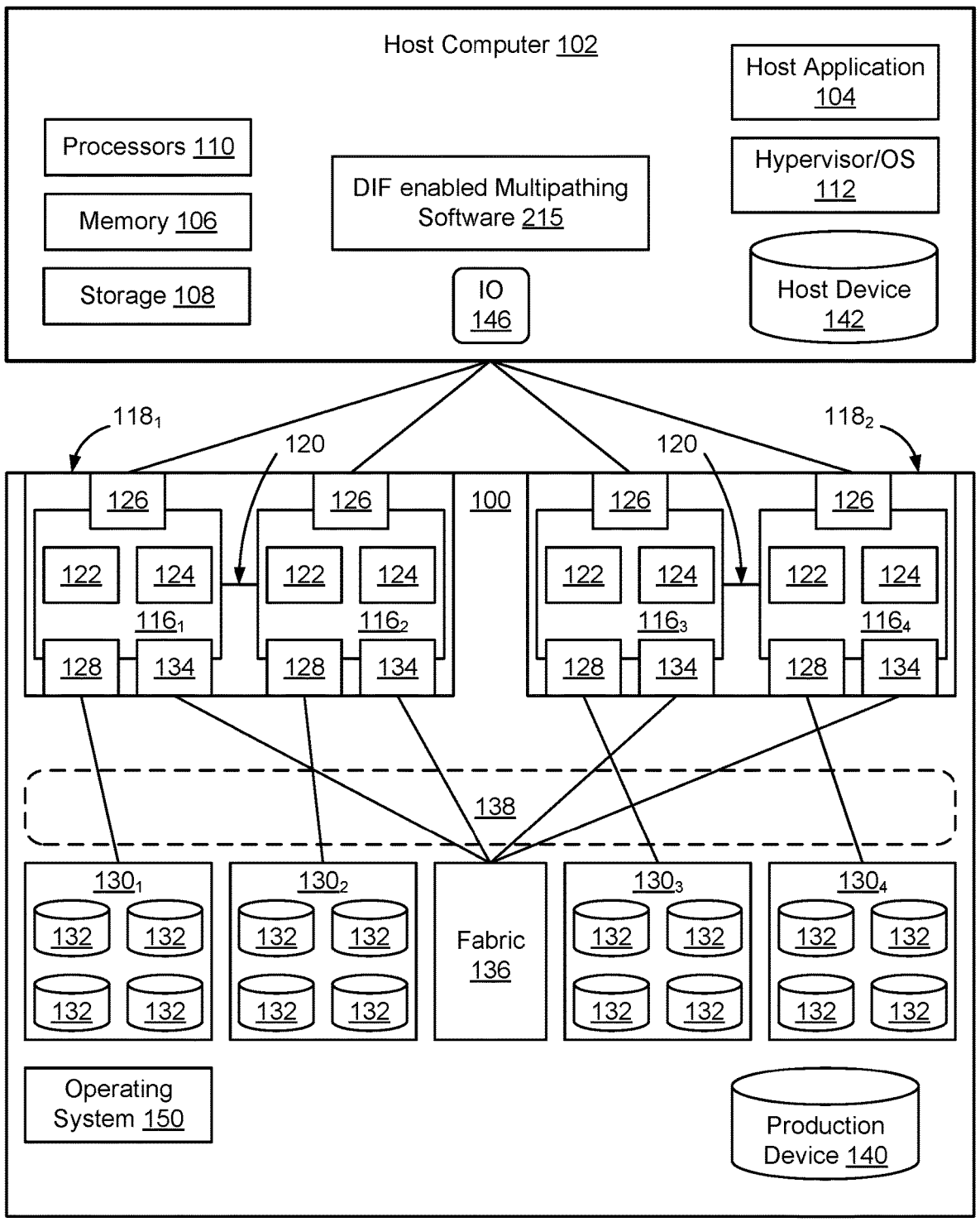
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

Data Integrity Field (DIF) is a feature of Small Computer System Interface (SCSI) based storage systems that is used for error detection and correction. It allows the storage device to verify the data as it is being written or read. Specifically, DIF was proposed in 2003 and included extending the disk sector from its traditional size of 512 bytes to 520 bytes, by adding an additional eight protection bytes to the 512-byte data block. The 8-byte extension used by DIF to implement verification of IO operations includes a GUARD Tag (two bytes) which includes a CRC calculated on the 512-byte data block, an application identifier (two bytes) that identifies the application associated with the IO operation, and a reference tag (four bytes) that is used to check misdirected write operations. The DIF data is computed and interleaved along with the actual information block having a length of 512 bytes. This data is generally offloaded to the Direct Memory Access (DMA) controller by the Host Bus Adapter (HBA)/Network Interface Card (NIC) for transfer across Storage Area Networks (SANs). The data along with the DIF signature is stored in the storage array, and can be used for end-to-end data verification, e.g., with verification at both the source of the data, which is the Host Bus Adapter (HBA)/Network Interface Card (NIC) on the host computer 102, and the target, which is the front-end array port such as the front-end adapter 126 of storage system 100.

Figure 2:
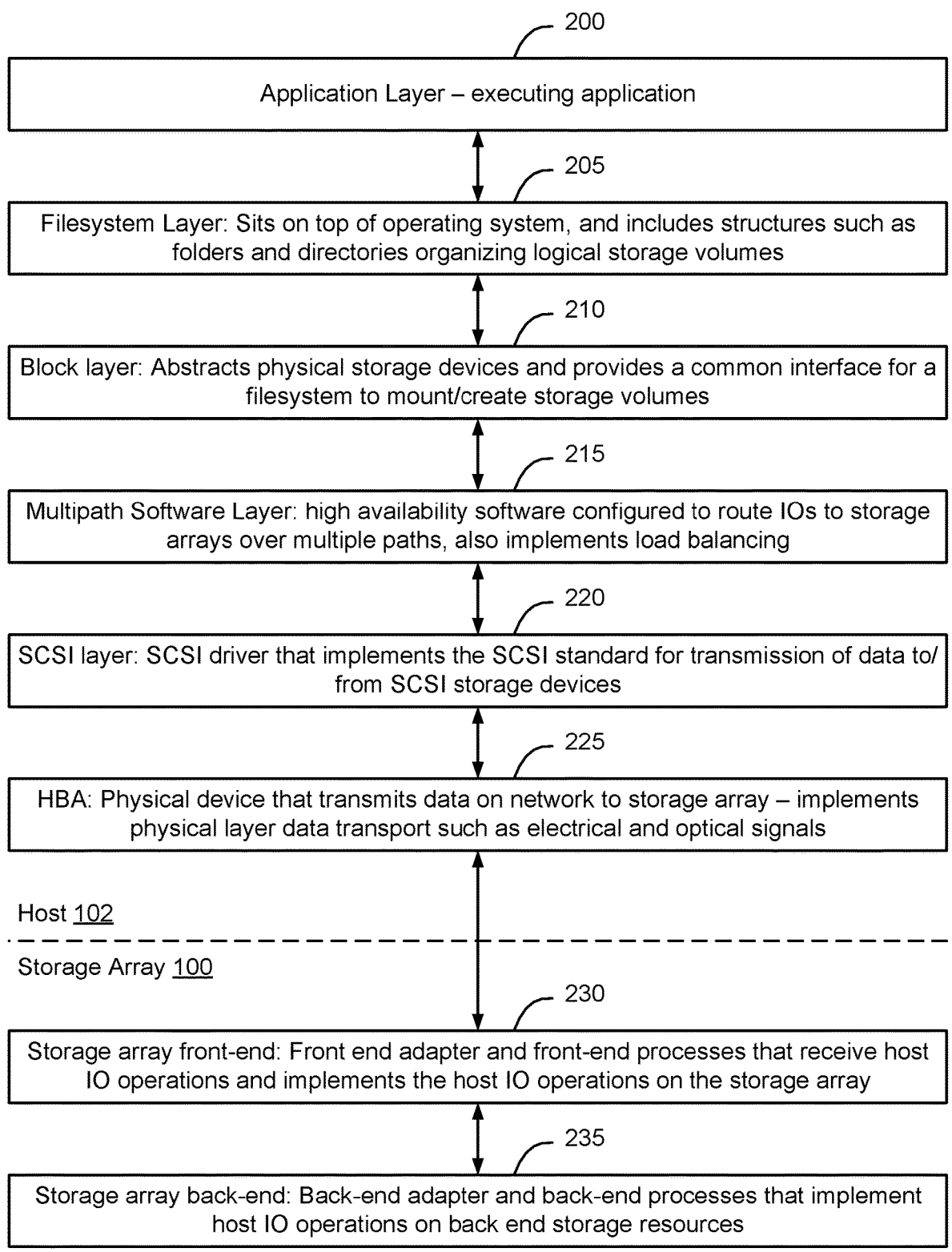
FIG. 2 is a block diagram of an example set of processes implementing an IO path between an application layer on a host computer and back-end storage resources of a storage system, according to some embodiments.

FIG. 2 is a block diagram of an example set of processes implementing an IO path between an application layer 104 on a host computer 102 and back-end storage resources 132 of a storage system 100, according to some embodiments. As shown in FIG. 2, in some embodiments an IO path between an application layer 200, which is an executing application, and the back-end storage resources of a storage array 235, contains many layers. Each layer performs one or more functions to facilitate implementation of IO operations by the application layer 200 on the storage array back-end 235. For example, as shown in FIG. 2, in some embodiments the IO path includes a filesystem layer 205 that sits on top of an operating system on which the application is executing. The filesystem layer 205 includes constructs such as folders and directories that organize logical storage volumes. The IO path also includes a block layer 210 that abstracts physical storage devices and provides a common interface for a filesystem to mount/create storage volumes.

IO operations on the filesystem/block layer are passed to a multipathing software layer 215 that resides just above the operating system layer. The multipathing software layer 215, in some embodiments, is high availability software that operates in the context of the operating system, and is configured to route IO operations from the host 102 to one or more storage arrays 100 over multiple paths, and in some embodiments also implements load balancing. For example, as shown in FIG. 1, in some embodiments there may be multiple paths between host 102 and different front-end adapters 126 of storage system 100. Similarly, multiple storage systems 100 may provide concurrent access to the same storage volumes and, hence, may be connected by multiple paths to host 102. In some embodiments, the multipathing software 215 is responsible for routing IO operations between the host 102 and storage arrays 100 over multiple available paths, to cause the IO operations to be serviced by one or more storage systems 100.

Once a path has been determined by the multipathing software 215, the IO operation is passed to the Small Computer System Interface (SCSI) layer 220. In some embodiments, for example, the SCSI layer 220 may be implemented using a SCSI driver that implements the SCSI standard for transmission of data to/from SCSI storage devices. Data from the SCSI layer 220 is passed to the Host Bus Adapter/Network Interface Card (HBA/NIC) 225, which is a physical device that transmits data from the host computer 102 onto a network to the storage system 100. Storage system 100 is also referred to herein as the "storage array". The HBA/NIC 225, in some embodiments, implements the physical layer data transport operations such as by generating and transmitting electrical, optical, or wireless signals in conformance with one or more networking protocol standard onto a physical transmission medium such as an electrical wire, optical fiber, or air channel.

At the storage array 100, a storage array front-end 230 is provided that receives the host IO operations and implements the host IO operations on the storage array. Multiple different storage array front-end processes may be implemented depending on the implementation. In some embodiments, the storage array also has a storage array back-end 235, which is responsible for implementing host IO (read and write operations) in back-end storage resources.

Figure 3:
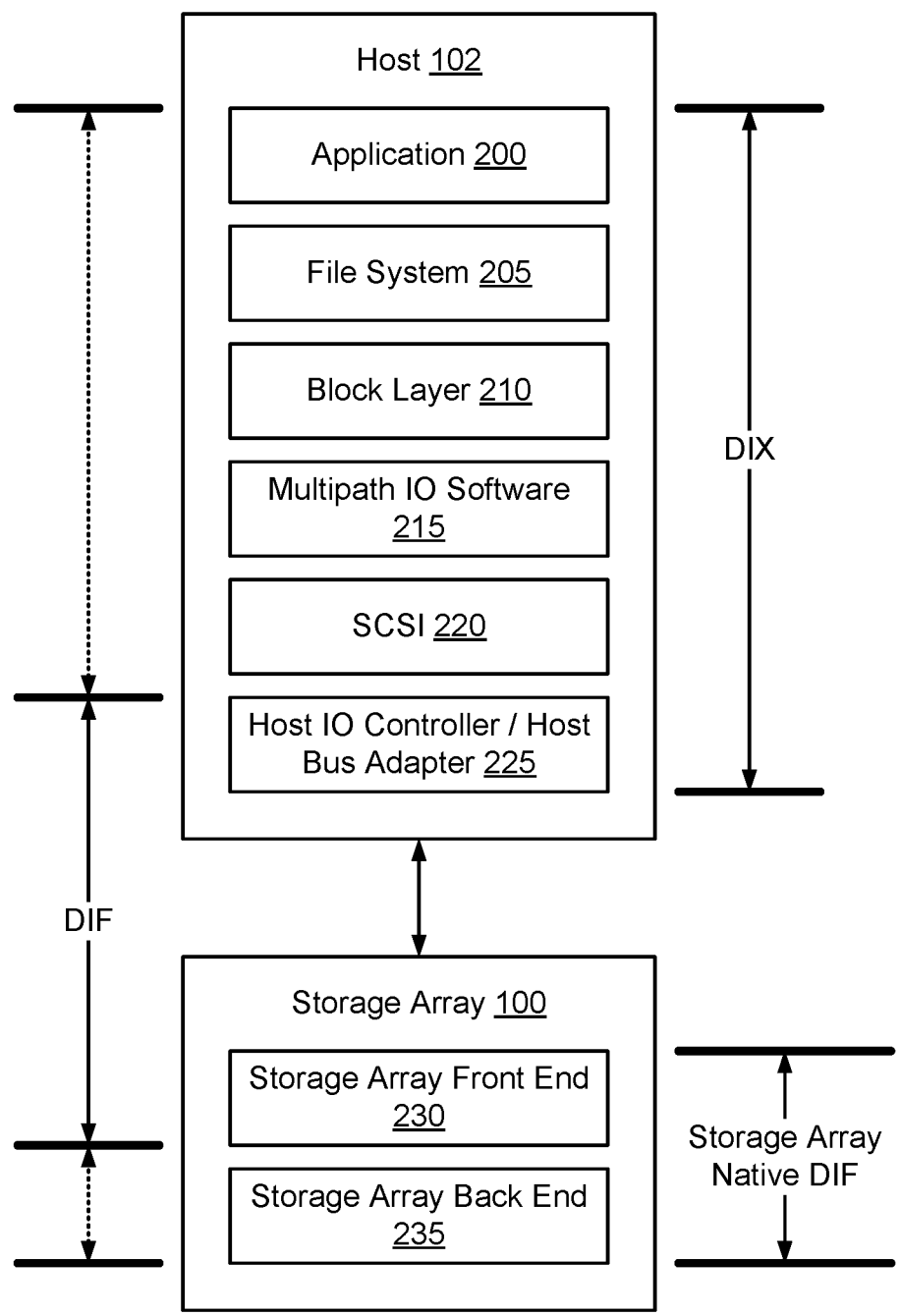
FIG. 3 is a block diagram of the example IO path of FIG. 2, illustrating application of Data Integrity Field (DIF) and Data Integrity Extensions (DIX) to implement data integrity verification on IO operations on the IO path of FIG. 2.

FIG. 3 is a block diagram of the example IO path of FIG. 2, illustrating application of Data Integrity Field (DIF) and Data Integrity Extensions (DIX) to implement data integrity verification on IO operations on the IO path of FIG. 2. As shown in FIG. 3, conventionally DIF is used to provide data integrity verification from the host IO controller/host bus adapter 225 through to the storage array front-end 230. Because storage arrays 100 often independently provide support for DIF within the storage array (storage array native DIF between the storage array front-end 230 and storage array back-end 235), FIG. 3 shows DIF data integrity verification as extending from the Host IO controller/HBA through to the storage array back-end 235.

However, for DIF to be used, the host 102 needs to have a supported operating system (OS) 112, and also needs to have a Host Bus Adapter (HBA) that supports this functionality and the required drivers (host IO controllers). In the case of legacy HBAs, this facility is not available, which can limit the use of DIF in particular situations.

As shown in FIG. 3, it is possible for data integrity verification to be implemented at the application layer, using Data Integrity Extensions (DIX). For example, DIX can be used to implement data integrity between the application layer 200 and the host bus adapter (HBA) 225. The DIX feature allows for data integrity verification to be performed at the application layer 200, but only applications that are designed for use with O_DIRECT I/O (direct IOs) are compatible with this feature. O_DIRECT is a flag that is passed when a file is opened. It instructs the operating system to bypass the page cache and perform any IO operations directly against storage. Since some applications are not configured to operate in this manner, the use of DIX as a replacement for DIF is not ensured to be possible for all applications 200. Accordingly, in some instances the data integrity scheme shown in FIG. 3 is unavailable, for example where the HBA is not able to implement DIF and where the application is not able to implement DIX. In this environment, the only data integrity checking that might be implemented on an application IO operation is implemented by the storage array native DIF processes, and these data integrity operations are only implemented internally within the storage array 100, on IO operations after the application IO operation have been received by the storage array front-end 230. These storage array native DIF operations are not able to ensure that the data that is received by the storage array has not been corrupted within the host IO stack or on the network connection between the host 102 and storage array 100.

Figure 4:
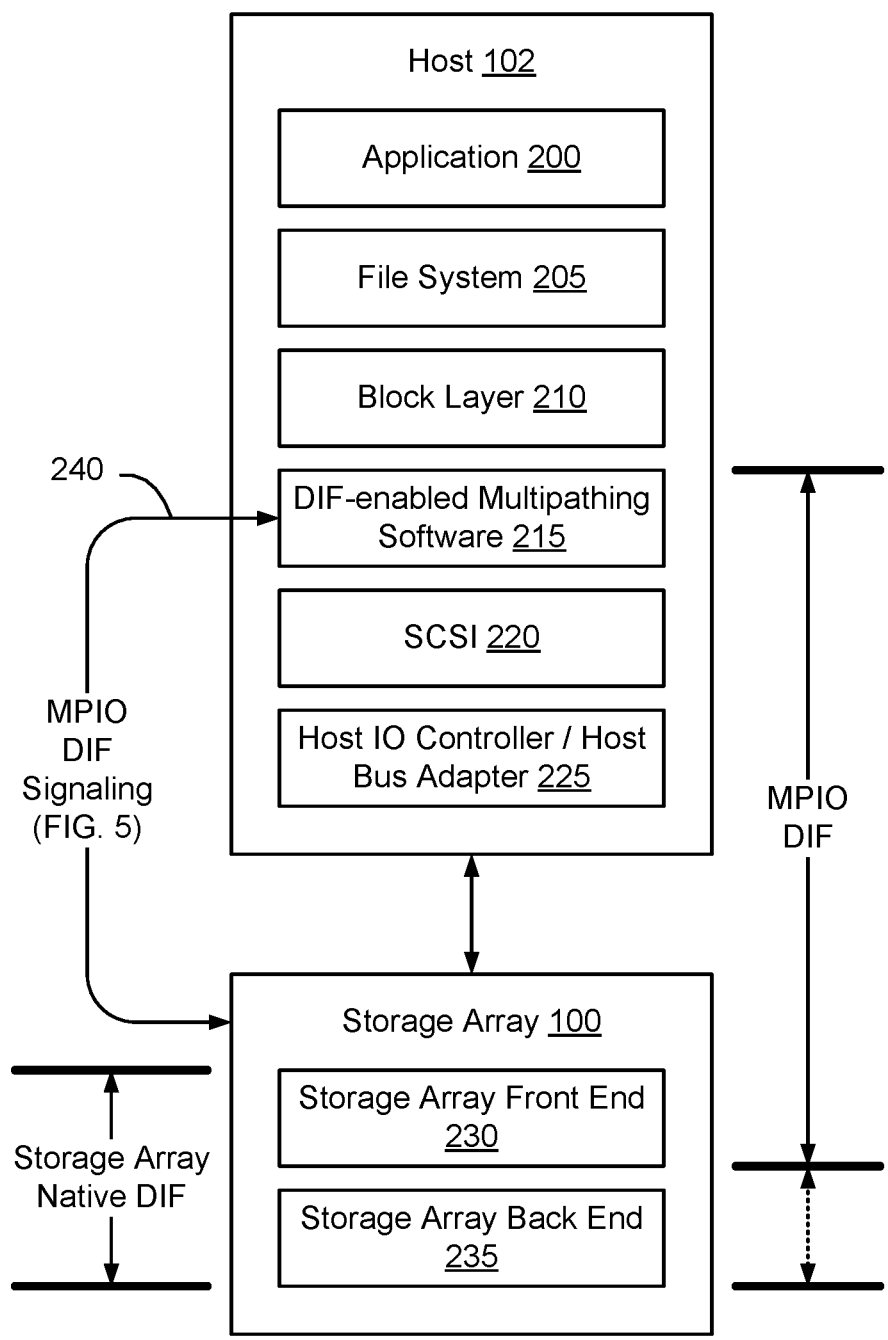
FIG. 4 is a block diagram of the example IO path of FIG. 2, illustrating implementation of data integrity verification by multipathing software on IO operations on the IO path of FIG. 2, according to some embodiments.

FIG. 4 is a block diagram of the example IO path of FIG. 2, illustrating implementation of data integrity verification by multipathing software 215 on IO operations on the IO path of FIG. 2, according to some embodiments. As shown in FIG. 4, in some embodiments host 102 resident multipathing software 215 is configured to implement both the functions of multipathing software 215 such as host IO route determination, as well as DIF processing to add and remove the 8-byte DIF extensions to write and read IO operations received from application 200. Implementing DIF processing by the multipathing software 215 will be referred to herein as "MPIO DIF".

Specifically, in connection with a write IO operation, the multipathing software 215 is configured to add the 8-byte DIF extension to a 512-byte data block received from the application 200. For example, in some embodiments the multipathing software 215 performs CRC/IP checksum calculations to update the DIF GUARD tag and informs the storage array to evaluate the calculated GUARD tag at the array side to verify data integrity on IO operations received from application 200. MPIO DIF enables data integrity to be provided from the multipathing software 215 through to the storage array front-end 230, and can be applied to all hosts regardless of whether the host environment (e.g., HBA 225) is supported for DIF, and regardless of whether the host application 200 is supported for DIX. Although FIG. 4 shows MPIO DIF extending through to the back-end 235 of storage array 100, in some embodiments the storage array 100 independently provides support for DIF within the storage array (e.g. storage array native DIF). Accordingly, although in some embodiments the MPIO DIF extends between multipathing software 215 and storage array front-end 230, FIG. 4 shows the effective DIF data integrity verification as extending from the multipathing software 215 through to the storage array back-end 235.

In some embodiments, as shown in FIG. 4, the multipathing software 215 implements MPIO DIF signaling 240 (FIG. 4, arrow 1), which enables the multipathing software 215 to specify to the storage array 100 which application IOs are being verified using MPIO DIF. For example, in some embodiments the multipathing software 215 is configured to tag IO operations by particular applications by inserting an application identification value in the application identifier tag of the DIF extension. MPIO DIF signaling is used to notify the array, for example via a log select command, to perform data integrity verification on IOs arriving at the storage array front-end ports that are tagged with the value of the identified application tag. By implementing MPIO DIF signaling, it is possible for administrators to specify which applications they want to have the IO integrity checked, and not to be restricted to applications that are compatible with the DIX feature.

As shown in FIG. 4, in some embodiments multipathing software 215 sits in the IO path between the application 200 and the host bus adapter/host IO controllers 225, and hence can intercept application IOs. The multipathing software 215 can identify the nature of the host IO (read/write/metadata), the source (application that generated the IO), the size, and other IO characteristics. In some embodiments, the multipathing software 215 can take user requests, for example from a host administrator or storage administrator, to track a particular application 200 or a virtual machine, for example where the application is implemented in a virtual machine that is abstracted from the operating system via a hypervisor. In response to a request to track a particular application/VM, the multipathing software 215 sends a log select page to the storage array 100 using MPIO signaling 240 to notify the storage array 100 that MPIO DIF will be implemented on the particular application on the host 102. In some embodiments, the storage array 100 is previously configured to have application awareness via application aware IO tagging, which can be utilized to share the application identifier tag used by the multipathing software 215 to implement application tagging in connection with MPIO DIF. Additional details associated with implementing MPIO DIF signaling is described in connection with FIG. 5.

In some embodiments, the multipathing software 215 implements MPIO DIF on application write IO operations by inserting an identifier of the application in the 2-byte APPLICATION IDENTIFIER tag field of the DIF header. The multipathing software 215 calculates a Cyclic Redundancy Check (CRC) on the 512-byte data block, which is computed using the standard DIF process specified in the T10 standard, and adds the CRC to the GUARD tag of the DIF header. In some embodiments, the CRC calculation is offloaded by the multipathing software 215 to a thread pool which computes this value in parallel for the 512-byte data block and creates the 2-byte GUARD tag.

In some embodiments, MPIO DIF is used in instances where the application 200 is not configured to implement data integrity verification using Data Integrity Extension (DIX). The main control used by DIX is a STOR_DIF flag that indicates whether a Data Integrity Field (DIF) is appended to each block on a SCSI device. If this control indicates that Data Integrity Extensions (DIX) is disabled (i.e., STOR_DIF is 0), the device operates in the normal legacy manner. If this control indicates that the DIX is enabled (i.e., STOR_DIF is 1), each block on the device is expected to have a Data Integrity Field attached. In some embodiments, by setting the STOR_DIF flag to 0 (hidden DIF), it is possible for the multipathing software 215 to interleave the 8-byte DIF onto 512-byte datagrams received from the application when forwarding the host IO write operations toward the storage array, and remove the 8-byte DIF field from the 520-byte datagram received from the storage array prior to forwarding the 512-byte data block to the application 200, in connection with host read IO operations. Additional details associated with implementing MPIO DIF operations in connection with host IO write operations is described in connection with FIG. 6.

In connection with read IO operations, in some embodiments when a read IO response is received by the multipathing software 215 from the storage array 100, the multipathing software 215 determines whether the IO belongs to an application/storage volume (Logical Unit Number (LUN)) that has been specified by the user, and on which MPIO DIF processes are required to be implemented. In some embodiments, a dedicated thread pool is used to determine whether the read IO is an MPIO DIF IO or a non-MPIO DIF IO. If the multipathing software 215 is required to implement DIF processing, the MPIO calculates a CRC from the data block, and compares the calculated CRC with the CRC contained in the GUARD tag to verify the integrity of the data block. Additional details associated with implementing MPIO DIF operations in connection with host IO read operations is described in connection with FIG. 7.

Figure 5:
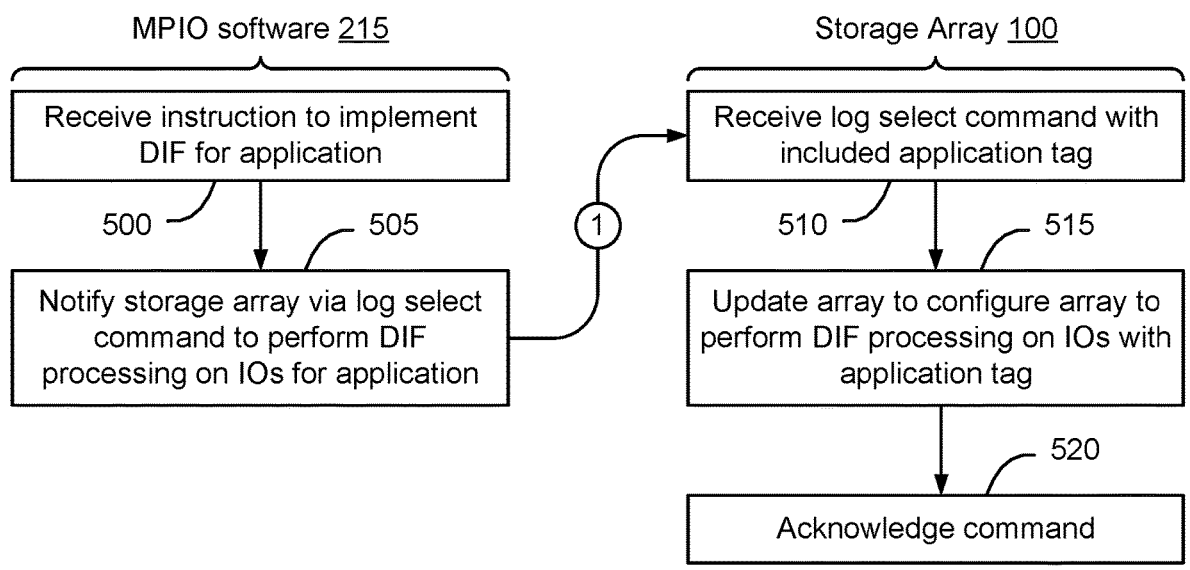
FIG. 5 is a flowchart of an example process of data integrity control signaling between multipathing IO (MPIO) software and a storage array to implement data integrity verification on IO operations by particular applications, according to some embodiments.

FIG. 5 is a flowchart of an example process of data integrity control signaling between multipathing IO (MPIO) software 215 and a storage array 100 to implement data integrity verification on IO operations by particular applications, according to some embodiments. As shown in FIG. 5, in some embodiments the multipathing software 215 receives instructions to implement DIF for a particular application or set of applications 200 executing on a host 102 (block 500). The multipathing software 215 updates its internal data structures, determines a set of application identifiers associated with the identified applications, and notifies the storage array 100, for example via a log select command, to instruct the storage array to perform DIF processing on IO operations for the identified applications (block 505, and FIG. 5, arrow 1). The storage array 100 receives the log select command with the included application tag or set of application tags (block 510) and updates the storage array to configure the storage array to perform DIF processing on IOs tagged with the application tag (block 515). Optionally, the storage array 100 sends an acknowledgment (block 520) to the multipathing software 215 (block 520).

Figure 6:
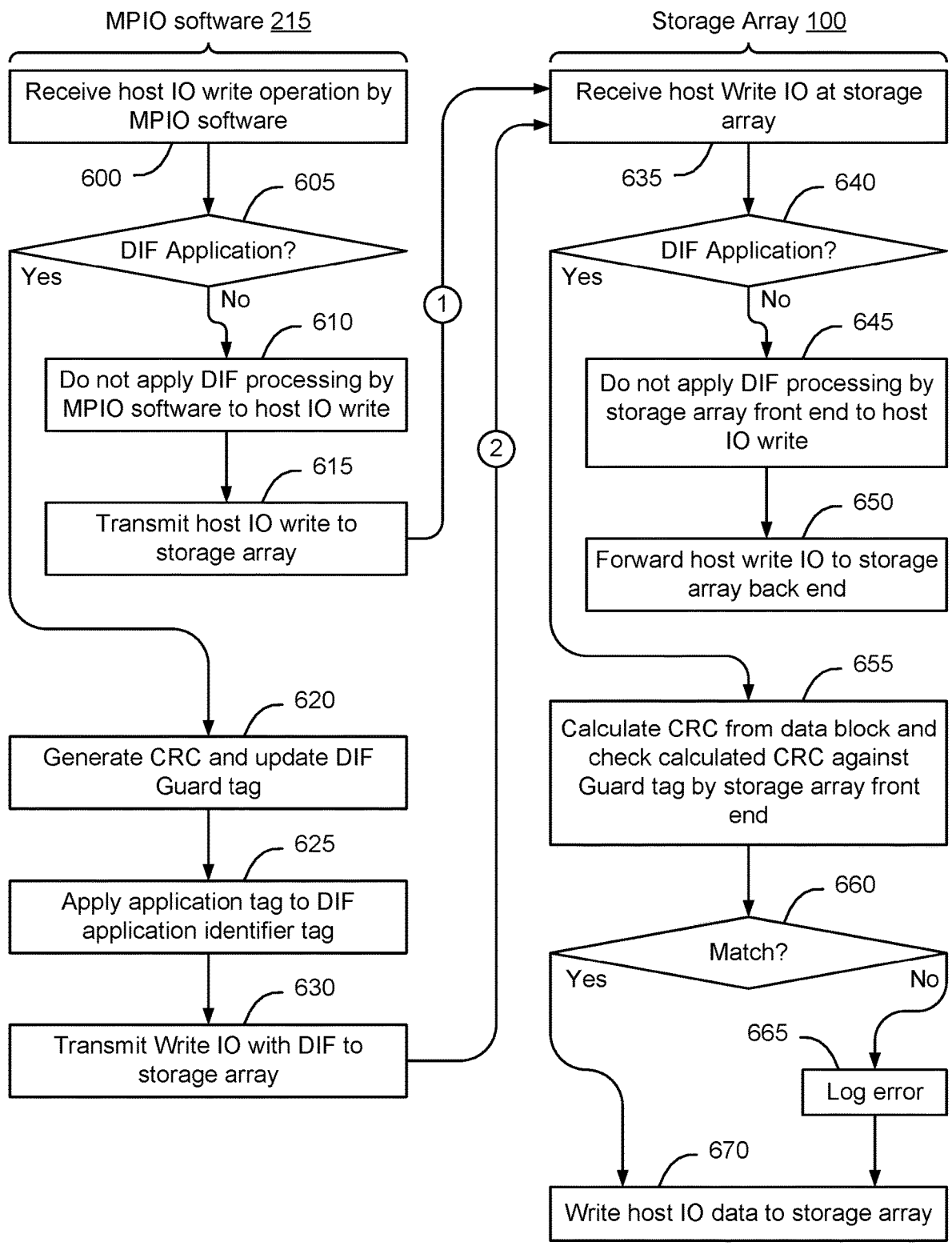
FIG. 6 is a flowchart of an example process of implementing multipathing software-based data integrity verification by multipathing software in connection with write IO operations on the IO path of FIG. 2, according to some embodiments.

FIG. 6 is a flowchart of an example process of implementing multipathing software-based data integrity verification by multipathing software 215 in connection with write IO operations on the IO path of FIG. 2, according to some embodiments. As shown in FIG. 6, in some embodiments when the multipathing software 215 receives a host IO write operation from an application (block 600) the multipathing software 215 determines whether the application that generated the host IO write operation is a "DIF-enabled application" (block 605). As used herein, the term "DIF-enabled application" is used to refer to an application that has been identified to the multipathing software 215, as an application where the multipathing software 215 should implement DIF processing on IO operations by the application. It should be noted that a "DIF-enabled application" can be specifically identified as an application where the multipathing software 215 should implement DIF processing. DIF-enabled applications can also be identified by specifying that the multipathing software 215 can be enabled by default, such that all applications are DIF-enabled applications except those applications where the multipathing software 215 is instructed to not implement DIF processing. As described in greater detail herein, when an application is a "DIF-enabled application" the multipathing software 215 implements DIF processing on write IO operations by the application, by adding DIF header to the 512-byte data blocks generated by the application prior to sending the write IO operations to the storage array 100 as 520-byte write operations. Likewise, when an application is a "DIF-enabled application" the multipathing software 215 implements DIF processing on read IO operations by the application, by removing the 8-byte DIF header from the 520-byte data blocks received from the storage array, prior to sending the read IO responses to the application as 512-byte data blocks.

In response to a determination that the write IO is from an application that is not a DIF application (a determination of NO at block 605), the multipathing software 215 does not implement DIF processing on the host IO write operation (block 610) and the multipathing software 215 transmits the host IO write operation to the storage array over a selected path (block 615, arrow 1).

In response to a determination that the write IO is from an application that is a DIF application (a determination of YES at block 605), the multipathing software 215 implements DIF processing on the host IO write operation. In some embodiments, the multipathing software 215 generates a CRC from the 512-byte data block (block 620). In some embodiments, the process of generating the CRC from the 512-byte data block is implemented by the multipathing software 215 by instructing a separate thread to implement the CRC processing on the data block of the host write IO. Once the CRC has been created, the multipathing software 215 uses the CRC to update the 2-byte DIF GUARD tag (block 620). The multipathing software 215 also applies the application tag to the 2-byte DIF application identifier tag (block 625). The multipathing software 215 also updates the other fields of the DIF header in the same manner. The 520-byte write IO, including the 512-byte data block and 8-byte DIF header, is then transmitted to the storage array (block 630, arrow 2).

At the storage array, the storage array receives the host IO write operation at the storage array front-end 230 (block 635). The storage array front-end may receive write IO operations associated with non-DIF applications (FIG. 6, arrow 1) or that are associated with DIF applications (FIG. 6, arrow 2). Accordingly, in some embodiments the storage array front-end 230 determines if the write IO has been received from an MPIO DIF application (block 640). In some embodiments, as described herein in connection with FIG. 5, the multipathing software 215 uses control path signaling to identify applications that are MPIO DIF applications to the storage array 100, and then inserts the application ID of applications that are MPIO DIF applications in the 2-byte application tag field of the DIF header applied by the multipathing software 215 (block 625). Accordingly, in some embodiments the storage array front-end 230 is able to determine whether the application associated with the host IO write operation is a MPIO DIF application or is not a MPIO DIF application by reading the value of the application tag of the DIF header and comparing the value of the application tag with the list of MPIO DIF applications previously communicated to the storage array front-end by the multipathing software 215.

In response to a determination that the host IO write operation is not from a MPIO DIF application (a determination of NO at block 640), the storage array front-end 230 does not apply DIF processing to the host write IO operation (block 645) to verify the data received at the front-end 230, and forwards the host write IO operation to the storage array back-end 235 (block 650). Although not shown, optionally the storage array internally implements DIF processing on the host IO write operation, for example between the storage array front-end 230 and storage array back-end 235, to implement data integrity processing within the storage array after the data is received at the storage array front-end 230.

In response to a determination that the host IO write operation is from an MPIO DIF application (a determination of YES at block 640), the storage array front-end 230 applies DIF processing to the host write IO operation (block 655), to verify the integrity of the data that is received by the front-end 230. Specifically, as shown in FIG. 6, in some embodiments the storage array front-end 230 calculates a CRC from the 512-byte data block, and compares the calculated CRC with the CRC contained in the GUARD tag (block 655) to determine if the calculated CRC matches the CRC from the GUARD tag (block 660). In response to a determination that the calculated CRC matches the CRC from the GUARD tag (a determination of YES at block 660), and the storage array front-end 230 forwards the host write IO operation to the storage array back-end 235 (block 670). In response to a determination that the calculated CRC does not match the CRC from the GUARD tag (a determination of NO at block 660), in some embodiments the storage array front-end 230 logs an error (block 665) and forwards the host write IO operation to the storage array back-end 235 (block 670).

Figure 7:
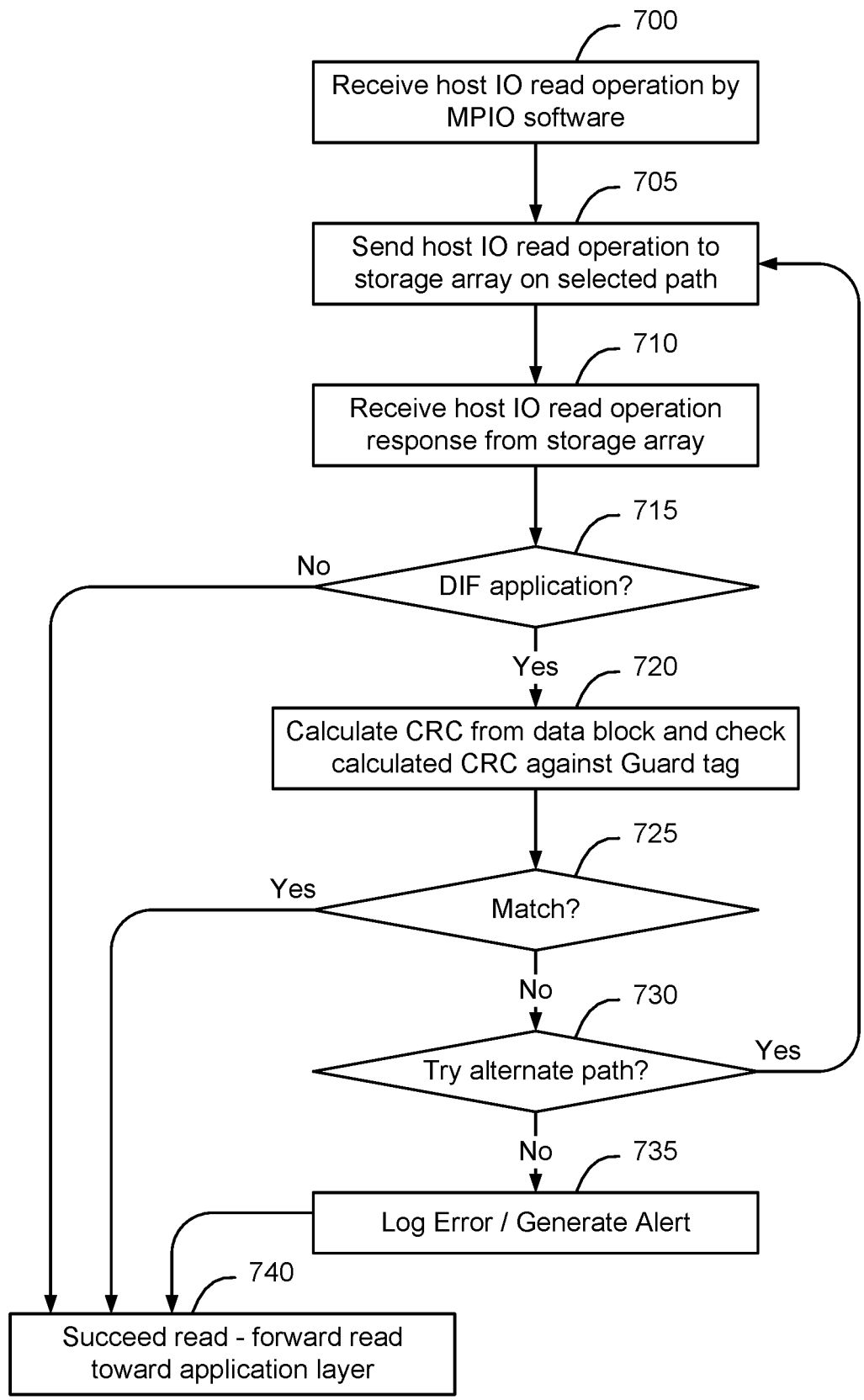
FIG. 7 is a flowchart of an example process of implementing multipathing software-based data integrity verification by multipathing software in connection with read IO operations on the IO path of FIG. 2, according to some embodiments.

FIG. 7 is a flowchart of an example process of implementing multipathing software-based data integrity verification by multipathing software 215 in connection with read IO operations on the IO path of FIG. 2, according to some embodiments. As shown in FIG. 7, in some embodiments the multipathing software 215 receives a host IO read operation (block 700) and forwards the host IO read operation to the storage array on a selected path (block 705).

The storage array retrieves the requested data, determines if the read operation is from an application that is a MPIO DIF application and, if so, applies the 8-byte DIF header to the 512 data block prior to transmitting the read response back to the host.

When the multipathing software 215 receives the response from the storage array (block 710), the multipathing software 215 determines if the read response is associated with a MPIO DIF application (block 715). For example, in some instances, the read response will be a 512-byte datagram, in which case there is no 8-byte DIF header and, accordingly, the multipathing software 215 does not implement DIF processing on the read IO response. In other instances, the read response will be a 520-byte datagram, that contains either an 8-byte DIF header or an 8-byte DIX header. In some embodiments, if a multipathing software 215 receives a read IO response that has a length of 520 bytes, the multipathing software 215 reads the DIF/DIX header to determine if the application ID contained in the application tag matches one of the applications that is a MPIO DIF application (block 715).

In response to a determination that the read response is not associated with a MPIO DIF application (a determination of NO at block 715) the read succeeds, and the read response is forwarded by the multipathing software 215 toward the application layer in the IO stack shown in FIG. 2 (block 740).

In response to a determination that the host IO read response is associated with an MPIO DIF application (a determination of YES at block 715), the multipathing software 215 applies DIF processing to the host read IO operation (block 720). Specifically, as shown in FIG. 7, in some embodiments the multipathing software 215 calculates a CRC from the 512-byte data block, and compares the calculated CRC with the CRC contained in the GUARD tag (block 720) to determine if the calculated CRC matches the CRC from the GUARD tag (block 725). In response to a determination that the calculated CRC matches the CRC from the GUARD tag (a determination of YES at block 725), the read succeeds, and the read response is forwarded by the multipathing software 215 toward the application layer in the IO stack shown in FIG. 2 (block 740).

In response to a determination that the calculated CRC does not match the CRC from the GUARD tag (a determination of NO at block 725), in some embodiments the multipathing software 215 tries the read IO operation on the storage array 100 using an alternate path (block 730). Data of the 512-byte data block can occasionally be changed due to transmission errors on the network interconnecting the host 102 and storage array 100, and trying an alternate path (block 730) may enable the requested data to be retrieved over an alternate path without error. In response to a determination that the multipathing software 215 should try an alternative path (a determination of YES at block 730) the read IO operation is sent to the storage array a second time (block 705). The process iterates a finite number of times until the CRCs match at block 725 (a determination of YES at block 725), or until a selected number of paths have been tried or until all available paths have been tried (a determination of NO at block 730).

In some embodiments, if the multipathing software 215 does not receive a read IO response from the storage array that has a CRC that matches the CRC calculated by the multipathing software 215 (a determination of NO at block 725, AND a determination of NO at block 730), the multipathing software 215 logs an error and optionally generates an alert (block 735). In some embodiments, the multipathing software 215 is configured to cause the read IO to succeed, even if the DIF processing indicates a possible error, and the multipathing software 215 forwards the host read IO response toward the application layer in the IO stack shown in FIG. 2 (block 740). In some embodiments, having the read IO succeed even when the MPIO DIF processing indicates the possibility of an error, enables the possible data discrepancy to be noted without causing the multipathing software 215 to impede success of read IO operations by the application on the storage array.

Although FIGS. 6 and 7 have focused on describing how read and write IO operations may be processed, similar steps may be followed in connection with implementing READ SAME, WRITE SAME, and OFFLOAD related commands. For example, in some embodiments the storage array microcode is configured to identify the application identifier tag based on the information shared earlier by the multipathing software 215, and to store the data along with the GUARD TAG, application identifier tag, and the reference tag. When a read command is requested for the above blocks, the data along with the GUARD tag, application ID, and reference tag are returned to the multipathing software.

With existing methods, data integrity with DIF is achievable with a valid operating system, HBA model, and HBA drivers. This enables DIF T10 protection to start at the IO controller and extend to the storage array, but does not extend further up the IO stack. By enabling DIF to be implemented at the multipathing software layer 215, which is higher in the IO stack, it is possible to implement data integrity starting from the multipathing layer itself. This enables data integrity verification to be implemented by any software on any IO stack, and by any third party or native multipathing software. Since the proposed implementation enables corrupted write/read IOs to be detected and aborted, it is possible to avoid silent data corruption which might otherwise compromise the integrity of the data contained in application read/write IO operations.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling data integrity verification with multipathing software and storage array microcode, comprising:
    identifying an application executing on a host to multipathing software executing on the host, to instruct the multipathing software to implement data integrity verification for Input Output (IO) operations by the application by adding Data Integrity Field (DIF) block extensions to write IO operations by the application and by processing DIF block extensions for read IO operations by the application;
    identifying the application to a storage array, by the multipathing software, to instruct the storage array to implement data integrity verification for IO operations by the application by processing DIF block extensions for the write IO operations by the application, and by adding DIF block extensions to responses to the read IO operations by the application;
    receiving write IO operations from the application executing on the host by the multipathing software executing on the host, each first write IO operation including a respective data block;
    adding respective DIF extensions to each respective write IO operation by the multipathing software executing on the host;
    routing the write IO operations with DIF extensions by the multipathing software over a plurality of paths between the host and the storage array, by selecting between the plurality of paths by the multipathing software for each respective write IO operation; and
    forwarding the write IO operations with DIF extensions over the respective selected paths to the storage array.

2. The method of claim 1, wherein the application is executing in the context of an operating system, and wherein the multipathing software is also executing in the context of the operating system.

3. The method of claim 1, wherein the multipathing software is implemented as part of a write IO path between the application and a host bus adapter, the host bus adapter being a physical component configured to transmit the write operations to the storage array.

4. The method of claim 3, wherein the write IO path includes a filesystem layer, a block layer, the multipathing software, a Small Computer System Interface (SCSI) driver, and the host bus adapter.

5. The method of claim 1, wherein the multipathing software is high availability software configured to route the IO operations by the application over the plurality of paths between the host and the storage array.

6. The method of claim 1, wherein adding the respective DIF extensions to each respective write IO operation comprises:
    calculating a Cyclic Redundancy Check (CRC) from each respective data block;
    inserting the calculated CRC into a first part of the respective DIF extension; and
    adding an application identifier into a second part of the respective DIF extension.

7. The method of claim 1, further comprising receiving a read IO operation by the multipathing software from the application;
    sending the read IO operation to the storage array over a first of the plurality of paths; and
    receiving a read IO response from the storage array;
    wherein processing DIF block extensions for read IO operations by the application comprises:
    determining by the multipathing software that the read IO response is responsive to the read IO request from the application, the read IO response including a data block and a DIF extension;
    implementing DIF data verification on the data block of the read IO response by the multipathing software using the DIF extension;
    removing the DIF extension from the read IO response by the multipathing software; and
    forwarding the data block of the read IO response to the application.

8. The method of claim 7, wherein implementing DIF data verification comprises calculating a Cyclic Redundancy Check (CRC) of the data block and comparing the calculated CRC to a value of a guard tag of the DIF extension.

9. The method of claim 8, further comprising, in response to comparing the calculated CRC with the value of the guard tag:
    determining that the calculated CRC does not match the value of the guard tag; and
    sending the read IO operation to the storage array over a second of the plurality of paths.

10. A system for enabling data integrity verification with multipathing software and storage array microcode, comprising:
    one or more processors and one or more storage devices storing instructions that are operable, when executed by the one or more processors, to cause the one or more processors to perform operations comprising:

identifying an application executing on a host to multipathing software executing on the host, to instruct the multipathing software to implement data integrity verification for Input Output (IO) operations by the application by adding Data Integrity Field (DIF) block extensions to write IO operations by the application and by processing DIF block extensions for read IO operations by the application;

identifying the application to a storage array, by the multipathing software, to instruct the storage array to implement data integrity verification for IO operations by the application by processing DIF block extensions for the write IO operations by the application, and by adding DIF block extensions to responses to the read IO operations by the application;

receiving write IO operations from the application executing on the host by the multipathing software executing on the host, each first write IO operation including a respective data block;

adding respective DIF extensions to each respective write IO operation by the multipathing software executing on the host;

routing the write IO operations with DIF extensions by the multipathing software over a plurality of paths between the host and the storage array, by selecting between the plurality of paths by the multipathing software for each respective write IO operation; and forwarding the write IO operations with DIF extensions over the respective selected paths to the storage array.

11. The system of claim 10, wherein the application is executing in the context of an operating system, and wherein the multipathing software is also executing in the context of the operating system.

12. The system of claim 10, wherein the multipathing software is implemented as part of a write IO path between the application and a host bus adapter, the host bus adapter being a physical component configured to transmit the write operations to the storage array.

13. The system of claim 12, wherein the write IO path includes a filesystem layer, a block layer, the multipathing software, a Small Computer System Interface (SCSI) driver, and the host bus adapter.

14. The system of claim 10, wherein the multipathing software is high availability software configured to route the IO operations by the application over the plurality of paths between the host and the storage array.

15. The system of claim 10, wherein adding the respective DIF extensions to each respective write IO operation comprises:

calculating a Cyclic Redundancy Check (CRC) from each respective data block;

inserting the calculated CRC into a first part of the respective DIF extension; and adding an application identifier into a second part of the respective DIF extension.

16. The system of claim 10, further comprising receiving a read IO operation by the multipathing software from the application;

sending the read IO operation to the storage array over a first of the plurality of paths; and receiving a read IO response from the storage array;

wherein processing DIF block extensions for read IO operations by the application comprises:

determining by the multipathing software that the read IO response is responsive to the read IO request from the application, the read IO response including a data block and a DIF extension;

implementing DIF data verification on the data block of the read IO response by the multipathing software using the DIF extension;

removing the DIF extension from the read IO response by the multipathing software; and forwarding the data block of the read IO response to the application.

17. The system of claim 16, wherein implementing DIF data verification comprises calculating a Cyclic Redundancy Check (CRC) of the data block and comparing the calculated CRC to a value of a guard tag of the DIF extension.

18. The system of claim 17, further comprising, in response to comparing the calculated CRC with the value of the guard tag:

determining that the calculated CRC does not match the value of the guard tag; and sending the read IO operation to the storage array over a second of the plurality of paths.

* * * * *